Aug. 5, 1947.                L. A. SHELLEY                2,425,130
                          TELESCOPE SIGHT MOUNT
                     Filed Oct. 31, 1944         2 Sheets-Sheet 2
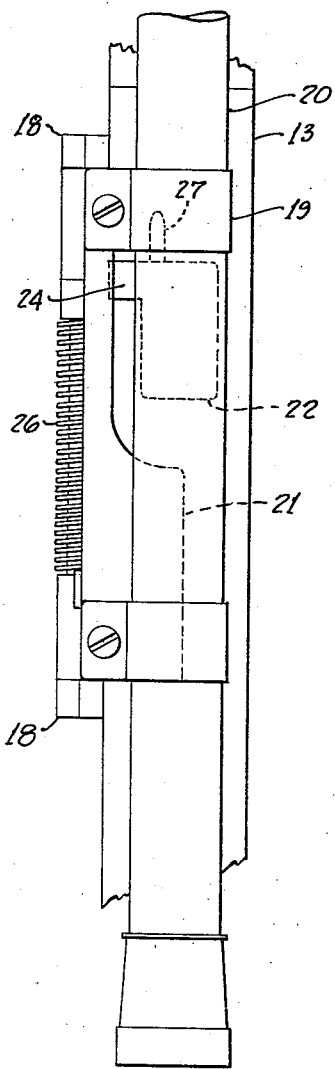
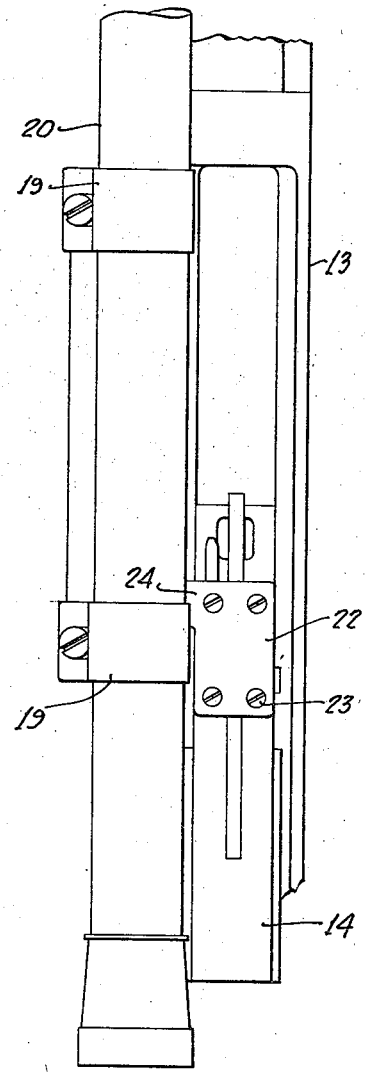
INVENTOR
LEWIS A. SHELLEY
ATTORNEY Patented Aug. 5, 1947

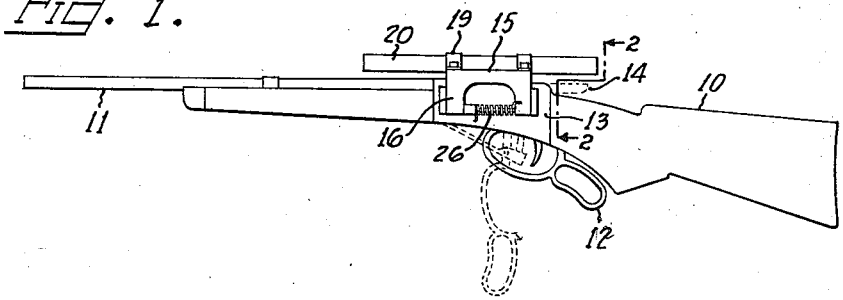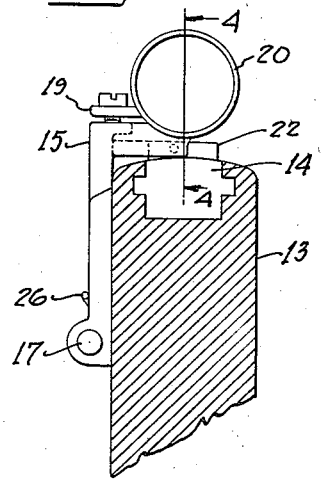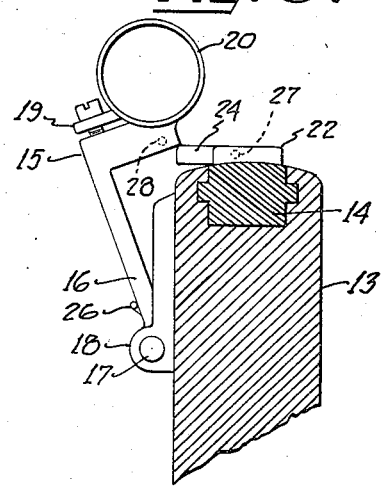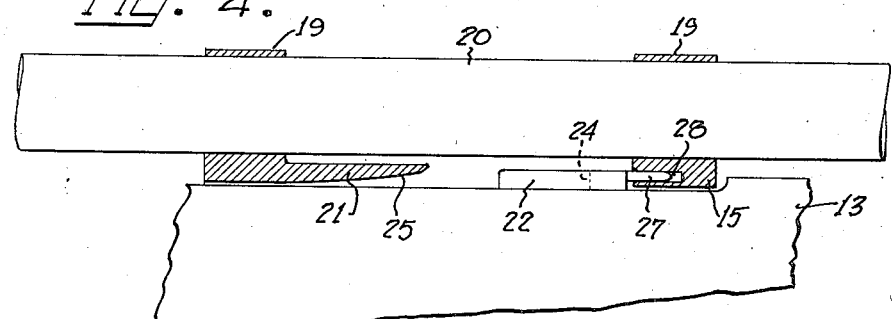

2,425,130

UNITED STATES PATENT OFFICE 2,425,130

TELESCOPE SIGHT MOUNT

Lewis A. Shelley, Portland, Oreg., assignor of one-half to Fannie M. Folkers, Portland, Oreg.

Application October 31, 1944, Serial No. 561,188

3 Claims. (Cl. 42—1)

This invention relates generally to fire arms, and particularly to a telescope sight mount.

The main object of this invention is to produce a sight mount for a telescope especially adapted for lever action rifles in which the empty shell is ejected vertically, that is, in a plane passing through the line of sight.

The second object is to produce a device of the class described which will be easy to manufacture and install on any lever action rifle, and in which absolute precision is obtained in the location of the telescope when the magazine is closed.

The third object is to construct the mounting so that the movement of the telescope is automatic and that the action is produced by the rifle lever without adding any additional load thereto.

The fourth object is to produce a telescope sight mount which can be operated manually as well as automatically.

These and other objects are described in the following specification as illustrated in the accompanying drawing, in which:

Fig. 1 is a side elevation of a rifle equipped with my device showing the open position of the lever in dotted lines.

Fig. 2 is a fragmentary section view taken along the line 2—2 of Figure 1 showing the telescope in a firing position.

Fig. 3 is a view similar to Fig. 2 but showing the telescope in a shell ejecting position.

Fig. 4 is a fragmentary section taken along the line 4—4 in Fig. 2, showing a telescope indexing pin in position for sighting.

Fig. 5 is a fragmentary plan showing the parts in position indicated in Fig. 2.

Fig. 6 is a fragmentary plan showing the parts in a position indicated in Fig. 3.

Similar numerals refer to similar parts throughout the several views.

Referring in detail to the drawings, there is shown a common form of rifle including the stock 10, a barrel 11, and actuating lever 12 and the receiver 13 in which is mounted the breech slide 14. The details of the firing and ejecting mechanism are omitted as they form no part of the present invention.

Referring particularly to my invention, I have provided a frame 15 whose lower portions 16 are hingedly mounted on the pin 17 which is supported by the brackets 18 which are secured in any convenient manner to the side wall of the receiver 13. The upper end of the frame is provided with the band clamps 19 by means of which is held the telescope 20.

Incorporated in the frame 15 is a cam 21 which extends longitudinally under the telescope 20. Secured on the slide 14 is a block 22 by means of the screws 23. The block 22 has formed thereon a cam follower 24 adapted to engage the under side 25 of the cam 21 when the slide 14 is retracted, and in so doing, swing the telescope 20 out of the plane of sight against the action of the spring 26 which is mounted on the pin 17, its purpose being to urge the telescope toward a sighting position.

On the forward end of the block 22 is mounted an indexing pin 27 which is adapted to register with a hole 28 in the frame 15. The purpose of the pin 27 is to insure a precise alinement of the telescope 20 in the sighting or firing position. Obviously, the pin 27 is withdrawn as the lever 12 is moved to the position shown in dotted lines in Fig. 1 and this withdrawal takes place before the follower 24 engages the cam surface 25. In some cases it may be found desirable to employ a roller for engagement with the cam 25, or the cam 25 may be incorporated in the block 22. The precise manner of attaching the telescope 20 to the frame 15 is not important, and modifications thereof could be employed without departing from the spirit of this invention.

I claim:

1. In combination a lever action rifle in which the empty shell is ejected vertically by mechanism sliding parallel to the line of sight and controlled by the lever, a telescopic sight mount hinged to the receiver or breech housing of the rifle so as to swing clear of the path of the ejected shell, a spring for urging the hinged mount to a sighting position, a telescope engaging frame member fast to the telescopic sight mount to form a portion thereof and having a recess therein, and means moving with the ejector mechanism for moving the mount about its hinge against the urge of the spring when said mechanism is moved in one direction and carrying indexing means to enter said recess to lock the mount in sighting position when the ejector mechanism is moved in the opposite direction.

2. In combination a lever action rifle in which the empty shell is ejected vertically by mechanism sliding parallel to the line of sight and controlled by the lever, a telescopic sight mount hinged to the receiver or breech housing of the rifle so as to swing clear of the path of the ejected shell, a spring for urging the hinged mount to a sighting position, a telescope engaging frame member fast to the telescopic sight mount to form a portion thereof and having a cam member, and means moving with the ejector mechanism to engage the cam member to cam the mount about its hinge out of the path of the ejected shell and against the urge of the spring as the lever is moved to shell ejecting position, said spring restoring the telescopic sight mount to sighting position as the lever and its controlled, sliding, ejecting mechanism is returned to original position and means partly carried by the ejector mechanism and partly by the swinging portion of the mount, for locking the mount in sighting position.

3. A top ejecting breech loading fire arm comprising a barrel, a receiver open at the top for the ejection of empty shells, a reciprocating bolt, a telescope holding member pivotally connected to the receiver to turn about an axis extending lengthwise of the barrel and being movable between an operative and an inoperative position, means carried by the bolt and cooperating with said holding member to turn the latter about its axis as the bolt reciprocates, and means rendered operative by the final forward movement of the bolt to lock the holding member in its operative position.

LEWIS A. SHELLEY.

REFERENCES CITED

The following references are of record in the file of this patent:

UNITED STATES PATENTS

| Number | Name | Date |
|---|---|---|
| 2,115,618 | Carl | Apr. 26, 1938 |
| 1,083,288 | Lowe | Jan. 6, 1914 |

FOREIGN PATENTS

| Number | Country | Date |
|---|---|---|
| 142,545 | Germany | July 22, 1903 |
| 24,953 | Great Britain | 1908 |